UNITED STATES PATENT OFFICE.

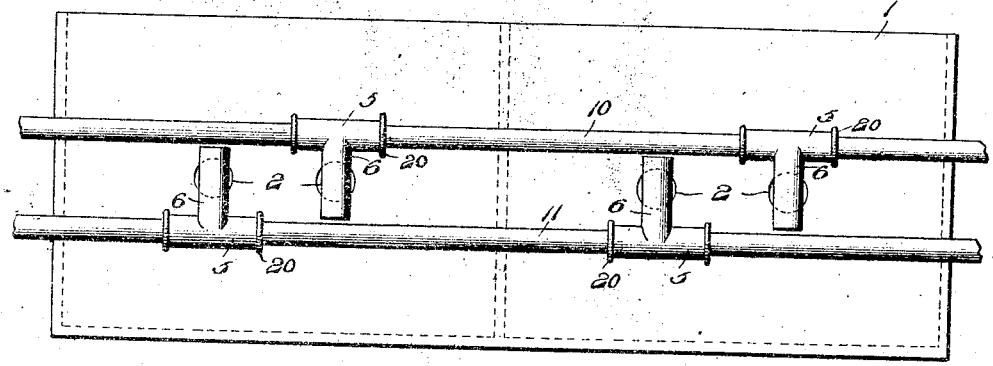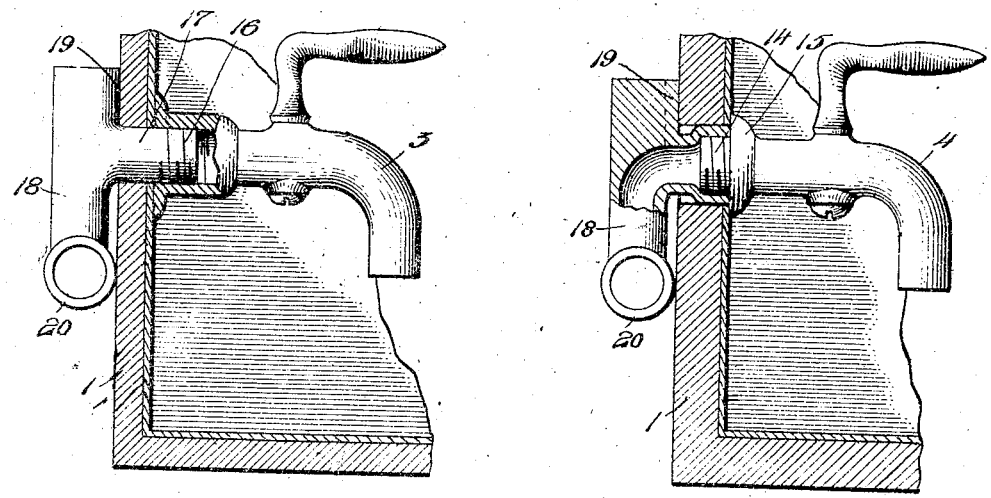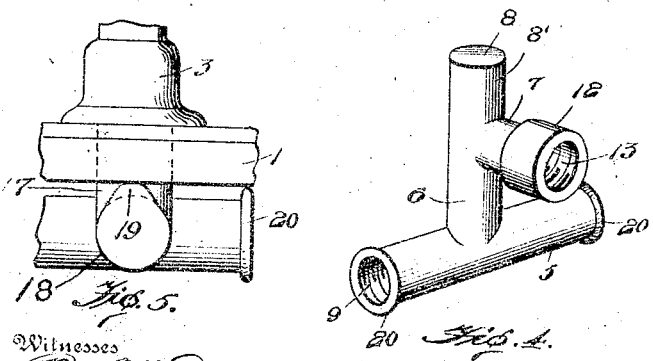

OTTO H. KLESSIG, OF HOUGHTON, MICHIGAN.

WASHTUB-FITTING.

No. 871,347.

Specification of Letters Patent.

Patented Nov. 19, 1907.

Application filed January 19, 1907. Serial No. 353,170.

*To all whom it may concern:*

Be it known that I, OTTO H. KLESSIG, residing at Houghton, in the county of Houghton and State of Michigan, have invented a certain new and useful Improvement in Washtub-Fittings, of which the following is a specification, reference being had therein to the accompanying drawing.

This invention is an improvement in washtub fittings, and relates particularly to a peculiarly constructed coupling.

The object of the invention is the provision of means for facilitating the securing of a faucet or faucets to a tub or tray, and the retaining of said faucets in a tight condition upon said tub.

With this and other objects in view, the invention consists in certain other novel constructions, combinations and arrangements of parts, as will be hereinafter fully described and claimed.

In the drawings: Figure 1 is a rear view, in elevation, of a wash-tub or tray, showing my improved fittings applied thereto. Fig. 2 is a fragmentary view of a tub, showing one of my couplings carried thereby and a faucet secured to said coupling. Fig. 3 is a fragmentary view of a tub, showing another embodiment of my coupling, partly in section, carried by said tub. Fig. 4 is a perspective view of another embodiment of my coupling. Fig. 5 is a fragmentary, top plan view of a tub and a fitting therefor.

Referring to the drawings, 1 designates a rear view of a wash-tub or tray which is provided with apertures 2 preferably formed in the same horizontal line. These apertures 2 are preferably formed in the back of the tub. By forming the apertures 2 in the same horizontal line, the faucets 3 and 4, Figs. 2 and 3 will be positioned in the same horizontal plane, when secured upon the tub.

Referring particularly to Fig. 4, 5 designates the horizontal primary tubular portion of my improved coupling, and 6 the auxiliary tubular portion thereof. The vertical, auxiliary portion extends at right-angles to the primary portion 5 and is preferably integral therewith near its central portion. A horizontal faucet-carrying portion or section 7 is integral with the portion 6 preferably near its outer end 8. The primary tubular portion 5 is preferably internally screw-threaded, as at 9, at each end, whereby the ordinary pipes 10 and 11 may be threaded into the ends of the primary portion 5. The faucet-carrying portion 7 is preferably enlarged at its outer end 12, and this outer, enlarged portion is provided with an internally screwthreaded portion 13. The faucet 4, Fig. 3, provided with an externally screw-threaded surface 14, at one end, may be secured to the coupling depicted in Fig. 4, by threading the end 14 into the end 12. The auxiliary portion 6 of the coupling is preferably, in the embodiment depicted in Fig. 4, formed of the same diameter or dimension throughout its entire length. When the coupling depicted in Fig. 4 is positioned upon a tub, and the faucet-carrying extension 7 inserted into an aperture 2, and faucet mounted upon the faucet-carrying portion 7, said faucet can be tightened upon said faucet-carrying portion 7, and cause face 8' to impinge against the back of the tube, thereby preventing the faucet from becoming loose upon the tub. This face or portion 8' of the outer end of the auxiliary portion 6 constitutes a bearing, whereby the flanged portion 15 of the faucet can be clamped tightly against the tub, thereby preventing the faucet from eventually working loose or rattling upon said tub.

In Fig. 2, the faucet-carrying portion 17 is provided with an externally screw-threaded portion 16. Of course, in this instance, one end of faucet 3 would have to be internally screw-threaded, so as to permit the faucet to be threaded upon the male-threads or externally threaded portion 16.

The inner face of the auxiliary portions 18 of the embodiments depicted in Figs. 2, 3, and 5, is provided, contiguous to its outer end, with a laterally extending, enlarged portion 19, which enlarged portion 19 constitutes a rib and engages the back of the tub. The rib or enlarged portion 19 is preferably of the same width or thickness as the collars 20 of the horizontal portions 5 of the couplings.

It will be obvious that when the couplings are placed against the back of the tub, see Figs. 1 to 3, the collars 20 and the enlarged portions or ribs 19 will fit snugly against the tub, thereby permitting the faucet to be screwed tightly upon the faucet-carrying portions, without drawing the couplings inward or permitting the same to eventually work loose. However, if it is desirable, these enlarged portions or ribs 19 need not be formed upon the couplings, but a coupling of substantially the structure depicted in Fig. 4, may be employed, which coupling has an auxiliary portion of the same diameter or dimension throughout its length and a bearing-face 8'.

By reason of the peculiar structure of my couplings, the horizontal, straight supply pipes are positioned close together and the faucets are all positioned in the same horizontal plane upon the tub or tubs. When a tub or tray is fitted with my couplings, any one of the couplings can be quickly unfastened from one supply pipe or line, and its position reversed and connected to the other pipe or line. Through one of these pipes hot water is supplied to the tub, while through the other pipe, cold water is supplied thereto.

The outer end of each of the auxiliary portions of my couplings is preferably solid, for the reason that this will give greater strength to the bearing-end, and increase the durability of the whole structure.

While my coupling is particularly adapted for a wash-tub, still it will be obvious that the same may be used upon any other receptacle, especially if two lines of separate pipes are employed. Furthermore, the collars 20 may be eliminated upon couplings which are not provided with the bearing ribs or enlarged portions 19, thereby permitting the couplings to lie snug against the receptacle or tub, when in position thereon, as shown in Fig. 1.

What I claim is:

1. As a new article of manufacture, a coupling comprising a horizontal, hollow portion provided with threaded ends, an auxiliary, vertical, hollow portion integral with and positioned intermediate the ends of said horizontal portion, a horizontal faucet-carrying hollow portion integral with and intermediate the ends of said auxiliary portion, and thereby producing a bearing portion upon the outer end of the auxiliary portion, and said faucet-carrying portion provided with a threaded end.

2. A coupling comprising a horizontal primary portion, a vertical auxiliary portion integral with said primary portion, and a faucet-carrying portion integral with said auxiliary portion intermediate its ends and positioned at right-angles to said primary and auxiliary portions.

3. A coupling comprising a primary, hollow portion, an auxiliary, hollow portion secured at right-angles to said primary portion, and a hollow supporting-portion secured at right-angles to and intermediate the ends of said auxiliary portion.

4. A coupling comprising a primary portion, an auxiliary portion, a faucet-carrying portion secured to said auxiliary portion, and a bearing rib or enlarged portion formed upon said auxiliary portion.

5. A coupling, comprising a horizontal, hollow portion, a vertical, hollow portion integral with said horizontal portion intermediate its ends, a horizontal, hollow faucet-supporting portion integral with said vertical portion intermediate its ends, a bearing rib or enlarged portion formed near the outer end of said auxiliary portion and upon the same side with said faucet-carrying portion.

6. A coupling, comprising a primary and an auxiliary portion, a faucet-carrying portion formed upon said auxiliary portion, and a bearing-rib formed upon said auxiliary portion contiguous to said faucet-carrying portion.

7. A coupling, comprising a primary portion, an auxiliary portion integral with said primary portion, and a faucet-carrying portion and bearing-rib formed upon one and the same side of the auxiliary portion.

8. In a device of the character described, the combination with a wash-tub, said tub provided with apertures formed in the same horizontal plane, of horizontal, straight pipes positioned contiguous to and upon opposite sides of said apertures, couplings connected to said pipes, each coupling provided with an auxiliary portion extending across one end of an aperture, faucet-carrying portions extending through said apertures and secured to the auxiliary portions intermediate their ends, and faucets carried by said faucet-carrying portions.

9. In a device of the character described, the combination with a tub, said tub provided with alined, horizontal apertures, of separate lines of pipes positioned contiguous to said apertures, couplings connected to said pipes, each coupling provided with an auxiliary portion extending across an aperture and having its outer end extending towards the opposite pipe line, and faucets positioned within the tub and connected to the auxiliary portions intermediate their ends.

10. In a device of the character described, the combination with a tub or tray provided with apertures, of separate lines of pipes positioned contiguous to said tub, a coupling connected to each line and provided with an auxiliary portion extending across an aperture, and horizontal faucet-carrying means extending through an aperture and secured to the auxiliary portion.

11. In a device of the character described, the combination with a tub provided with alined apertures, of a pair of separate pipes positioned contiguous to said apertures, couplings connected to said pipes, each coupling provided with a portion extending across an aperture, a bearing portion formed upon said last-mentioned portion, and faucet-carrying means secured to said portion extending across the aperture.

12. In a device of the character described, the combination with a tub provided with an aperture, a pipe positioned contiguous to said apertures, of a coupling connected to said pipe, said coupling provided with an auxiliary portion extending across said aperture, a bearing formed upon said auxiliary portion, and a faucet connected to said auxiliary portion intermediate its ends.

In testimony whereof I hereunto affix my signature in presence of two witnesses.

OTTO H. KLESSIG.

Witnesses:
C. H. FRIMODIG,
G. C. EDWARDS.